(12) United States Patent
Tokuhara

(10) Patent No.: US 8,006,555 B2
(45) Date of Patent: Aug. 30, 2011

(54) CAP MEMBER FOR COVERING SENSOR UNIT

(75) Inventor: Minoru Tokuhara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 342 days.

(21) Appl. No.: 12/222,559

(22) Filed: Aug. 12, 2008

(65) Prior Publication Data

US 2009/0056442 A1 Mar. 5, 2009

(30) Foreign Application Priority Data

Sep. 3, 2007 (JP) ................................. 2007-228167

(51) Int. Cl.
*G01D 11/24* (2006.01)
(52) U.S. Cl. ........................................................ 73/431
(58) Field of Classification Search ........................ 73/431
See application file for complete search history.

(56) References Cited

U.S. PATENT DOCUMENTS

| 6,452,381 | B1 | 9/2002 | Nakatani et al. | |
|---|---|---|---|---|
| 7,221,149 | B2 * | 5/2007 | Fukuoka et al. | 324/174 |
| 7,253,613 | B2 | 8/2007 | Tokuhara | |
| 7,307,417 | B2 | 12/2007 | Tokuhara et al. | |
| 7,408,344 | B2 * | 8/2008 | Tokuhara | 324/252 |
| 2003/0001566 | A1 * | 1/2003 | Tsuge et al. | 324/207.25 |
| 2007/0120555 | A1 | 5/2007 | Tokuhara | |
| 2007/0290679 | A1 * | 12/2007 | Okui et al. | 324/207.25 |

FOREIGN PATENT DOCUMENTS

| JP | A-S60-154025 | 8/1985 |
|---|---|---|
| JP | A-H08-053054 | 2/1996 |
| JP | A-2006-112801 | 4/2006 |
| JP | A-2006-275639 | 10/2006 |

OTHER PUBLICATIONS

Annotated Figure From United States Patent 7,221,149, originally published on May 2007.*
Office Action mailed on Aug. 25, 2009 from the Japan Patent Office for corresponding application No. 2007-228167 (English translation enclosed).

* cited by examiner

*Primary Examiner* — Hezron Williams
*Assistant Examiner* — Tamiko D Bellamy
(74) *Attorney, Agent, or Firm* — Posz Law Group, PLC

(57) ABSTRACT

A cap member for covering a sensor unit such as a rotational speed sensor is composed of a cylindrical wall, a thin bottom wall and an open end to be closed with a closing member. The cap member is formed by molding a resin material. Molten resin is injected into a cavity formed by an inner die and an outer die. After the injected resin is cooled, the inner die is separated from the molded cap member. If the molded cap member adheres to the inner die, it would be difficult to separate the inner die from the cap member by pulling out the inner die in the axial direction. A structure anchoring the cap member to the outer die is formed on an outer surface of the cylindrical wall. The anchoring structure may be formed in a shape of a ring or rings surrounding the center axis of the cap member. Alternatively, the anchoring structure may be formed in a shape of a depressed groove or grooves.

10 Claims, 4 Drawing Sheets

US 8,006,555 B2

CAP MEMBER FOR COVERING SENSOR UNIT

CROSS-REFERENCE TO RELATED APPLICATION

This application is based upon and claims benefit of priority of Japanese Patent Application No. 2007-228167 filed on Sep. 3, 2007, the content of which is incorporated herein by reference.

BACKGROUND OF THE INVENTION

1. Field of the Invention

The present invention relates to a cap member for covering a sensor unit and to a sensor device including such a cap member.

2. Description of Related Art

Some examples of a sensor device having a sensor unit contained in a cap member are disclosed in JP-A-2006-112801 and JP-A-2007-147461. The sensor unit includes a magnetoresistive element (MRE) and a magnet for giving a biasing magnetic field to the MRE. A rotational speed is detected based on resistance changes in the MRE due to a magnetic field intensity. The cap member is formed by molding a resin material into a cylindrical shape having a bottom end wall. A sensor chip in a bare chip state is used in the sensor unit, and an opening of the cap member is closed by laser-welding a closing member.

The cylindrical resin cap member having a bottom end wall is molded in a molding die including an outer die and an inner die. The inner die has to be separated from the cap member in its axial direction after molding operation is completed. In the process of separating the inner die from the molded cap member, there is a tendency that molded cap member adheres to the inner die and the molded cap member is taken out from the outer die together with the inner die. To avoid this problem, it is conceivable to provide a certain taper to an outer surface of the inner die. However, this is not easy from a standpoint of a shape of the biasing magnet to be contained in the cap member.

It is also conceivable to push the bottom wall of the cap member with an ejector pin to forcibly separate the inner die from the cap member. However, the bottom wall or other portions may be deformed by the ejector pin because a thickness of the bottom wall is made thin to obtain a high sensitivity of the sensor device. Separation of the inner die from the cap member becomes more difficult when a molding material having high molecule numbers, a lower content of glass-additives and a lower content of die-separating agents. This type of the molding material is used to improve transparency of laser in a process of welding a closing member to the cap member by laser. By reducing the die-separating agents, separation of the inner die becomes more difficult. By using a molding material having higher molecule numbers and a lower content of glass-additives, a curing time of the molded cap member becomes longer. This makes a cycle time of injection molding longer.

SUMMARY OF THE INVENTION

The present invention has been made in view of the above-mentioned problem, and an object of the present invention is to provide an improved resin cap member that is efficiently manufactured by molding.

A sensor device such as a rotational speed sensor is composed of a cap member, a closing member for closing an open end of the cap member and a sensor unit contained in the cap member. The cap member is formed by molding a resin material, using a molding die composed of an inner die and an outer die. The outer die is composed of an upper die and a lower die, both being separable from each other. A molding cavity is formed by assembling the upper die, the lower die and the inner die. Molten resin is injected into the cavity of the molding die.

After the molten resin is cooled in the molding cavity, the inner die is first separated from the molded cap member by drawing out the inner die in the axial direction. If the molded cap member adheres to the inner die, it is difficult to remove the inner die from the cap member. To avoid this situation, projected portions are formed on an outer surface of a cylindrical wall of the cap member, so that the projected portions engage with depressed grooves formed in the outer dies. In this manner, the inner die is easily removed from the molded cap member. Then, the upper die and the lower die are separated from each other to take out the molded cap member.

Depressed portions may be formed on the outer surface of the cylindrical wall in place of the projected portions. The projected portions or the depressed portions may be formed in a form of a ring surrounding the center axis of the cap member. Two or more rings may be formed to further improve the anchoring function of the rings. Flat portions may be formed on the projected portions or on the outer surface of the cylindrical wall, so that ejector pins for removing the molded cap member from the outer die are able to push the flat portions.

According to the present invention, the inner die is easily separated from the molded cap member after the molding process is completed. Accordingly, efficiency of the molding process is improved. Other objects and features of the present invention will become more readily apparent from a better understanding of the preferred embodiments described below with reference to the following drawings.

DETAILED DESCRIPTION OF THE PREFERRED EMBODIMENTS

Figure 1:
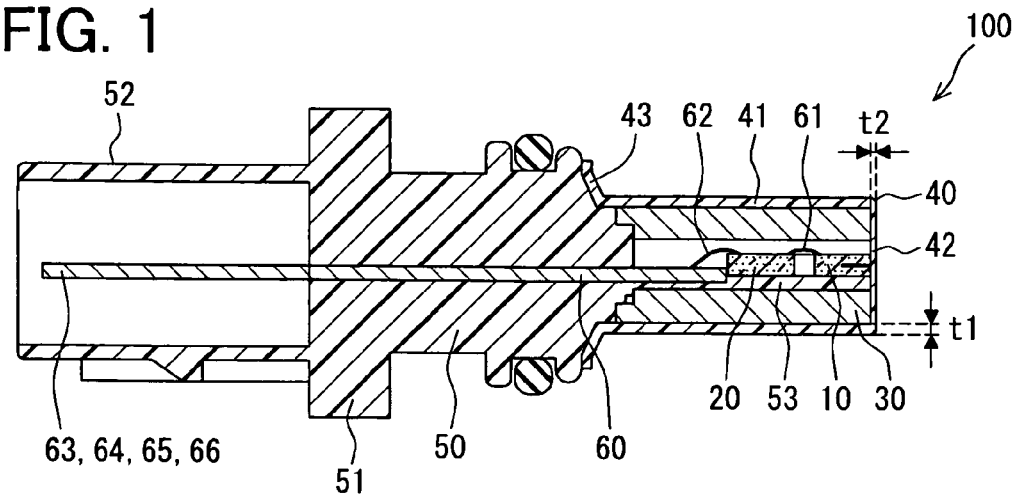
FIG. 1 is a cross-sectional view showing a sensor device, such as a rotational speed sensor.

A first embodiment of the present invention will be described with reference to FIGS. 1-4B. First, referring to FIG. 1, an entire structure of a rotational speed sensor 100 as an example of a sensor device will be described. The rotational speed sensor 100 detects a rotational speed of a rotating body such as a gear in a transmission of an automotive vehicle. Since such a rotational speed sensor is generally described in JP-A-2007-147461, it will not be described in detail, but a cap member used therein, which is the subject matter of the present invention, will be focused.

The rotational speed sensor 100 includes a cap member 40, a closing member 50 for closing an open end of the cap member and a sensor unit contained in the cap member 40. The sensor unit includes a sensor chip 10 in a form of a bare chip, a circuit chip 20 for processing signals from the sensor chip and a magnet 30 for providing a biasing magnetic field to the sensor chip 10. The sensor chip 10 is composed of magnetoresistive elements (MRE) made of a material such as Ni—Co or Ni—Fe for detecting changes in a magnetic field. In this particular embodiment, four MREs are used to form a couple of half bridges. The MREs are formed by a patterning process. The sensor chip 10 will not be described here in detail since it is described in JP-A-11-237256.

The circuit chip 20 electrically connected to the sensor chip 10 adjusts an amount of voltage supplied to the sensor chip 10 and processes output signals from the sensor chip 10, e.g., the output signals are differentially amplified and/or digitalized. The magnet 30 is disposed in a vicinity of the sensor chip 10 for supplying a biasing magnetic field to the sensor chip 10. A shape and form of the magnet 30 are not limited to those described here. In this particular embodiment, a hollow cylindrical magnet is disposed inside the cap member 40, and the sensor chip 10 is disposed in the hollow space of the cylindrical magnet 30.

The cap member 40 is made of a non-magnetic resin material by molding. The cap member 40 is composed of a cylindrical wall 41, a bottom wall 42 and a tapered wall 43 forming an open end. The open end is closed with the closing member 50 after the sensor unit is disposed in the cap member 40. A thickness t2 of the bottom wall 42 is made thinner than a thickness t1 of the cylindrical wall 41. The sensor chip 10 is disposed close to the thin bottom wall 42 to realize a high sensitivity.

The tapered wall 43, gradually widened toward the opening, is formed at the open end of the cap member 40. The closing member 50 is connected to the tapered wall 43, and a laser beam is irradiated on the tapered wall 43 thereby to connect the tapered wall 43 to the closing member 50. The resin material forming the cap member 40 has higher laser permeability than the resin material forming the closing member 50. In order to obtain higher laser permeability, a resin material having high molecule numbers, a low glass-additive content and a low die-separator content is used as the material forming the cap member 40.

Figure 2:
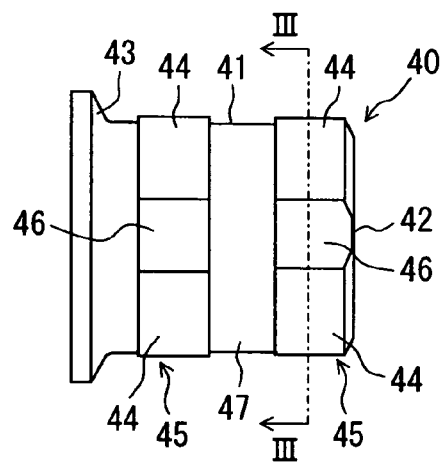
FIG. 2 is a side view showing a cap member used in the sensor device shown in FIG. 1, as a first embodiment of the present invention.
Figure 3:
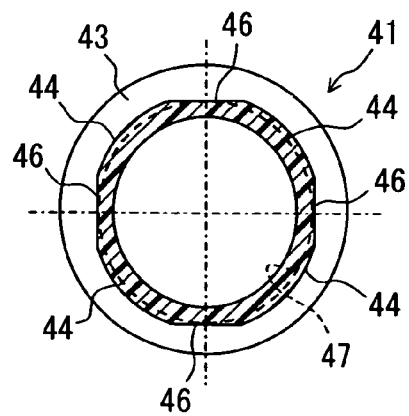
FIG. 3 is a cross-sectional view showing the cap member, taken along line III-III shown in FIG. 2.

As shown in FIGS. 2 and 3, projected portions 44 are formed on the outer surface of the cylindrical wall 41 except the tapered wall 43. The shape and form of the projected portion 44 are not limited to particular ones. In this embodiment, the projected portions 44 are made in a form of a continuous ring 45 surrounding the center axis of the cap member. The form of a continuous ring may be changed to a form of belts separated to several pieces in the circumferential direction. Two rings 45 are formed on the outer surface of the cap member 40, separated from each other in the axial direction. The projected portions 44 serve as anchors that prevent the cap member 40 from moving in the axial direction together with the inner die when the inner die is separated from the cap member 40 after a molding process is completed. This will be explained below in dail.

As shown in FIGS. 2 and 3, four portions of each projected portion 44 are flattened to form flat portions 46. The four flat portions 46 are formed at equal intervals in the circumferential direction. A neighboring region 47 is formed between two projected portions 44 (ring shaped). The flat portions 46 serve to separate an outer die from the cap member 40 after the molding process is completed. This will be explained later in detail. Gates for supplying molten resin into the molding die are formed around the flat portions 46, so that burrs formed in the molding process are easily removed.

Referring to FIG. 1 again, the closing member 50 connected to the cap member 40 by laser welding will be explained. A lead frame 60 is molded integrally with the closing member 50. The closing member 50 includes an extending plate 53 that is integrally formed with the closing member 50. The sensor chip 10 and the circuit chip 20 are mounted on the extended plate 53. The sensor chip 10 is electrically connected to the circuit chip 20 by bonding wires 61, and the circuit chip 20 is electrically connected to the lead frame 60 by bonding wires 62. The lead frame 60 also forms terminals at its tip portion. The terminals 63, 64, 65 and 66 serve as terminals for power supply, for outputting signals, for grounding and for adjusting characteristics of the sensor unit, respectively.

An axial end of the cylindrical magnet 30 is connected to an axial end of the closing member 50 and disposed inside of the cylindrical wall 41 of the cap member 40. The sensor unit composed of the sensor chip 10, the circuit chip 20 and the magnet 30 are all disposed in the inner space of the cylindrical magnet 30 and are hermetically closed with the closing member 50. Thus, the sensor unit is protected from the atmosphere. The closing member 50 also includes a connector portion 52 covering the terminals 63, 64, 65, 66, and a flange 51 for mounting the rotational speed sensor 100 on an engine, for example.

A manufacturing process of the rotational speed sensor 100 will be briefly explained below. The cap member 40 and the closing member 50 are formed by molding separately. In the molding process of the closing member 50, the lead frame 60 is insert-molded. Then, the sensor chip 10 and the circuit chip 20 are mounted on the extending plate 53 of the closing member 50. The circuit chip 20 is electrically connected to the read frame 60 by the bonding wires 62, and then the sensor chip 10 is electrically connected to the circuit chip 20 by the bonding wires 61. Then, the extending plate 53, on which the sensor chip 10 and the circuit chip 20 are mounted, is inserted into the inner space of the magnet 30. Then, an axial end of the magnet 30 is connected to the closing member 50 with adhesive.

Then, the magnet 30 is covered with the cap member 40 so that an axial end of the magnet 30 does not contact the bottom wall 42 of the cap member 40. The tapered wall 43 is forcibly pushed against the closing member 50, and then the tapered wall 43 and the closing member 50 are firmly connected by laser welding. The laser beam is irradiated on an outside surface of the tapered wall 43 to thereby melt either of the tapered wall 43 or the closing member 50 or both.

Figure 4A:
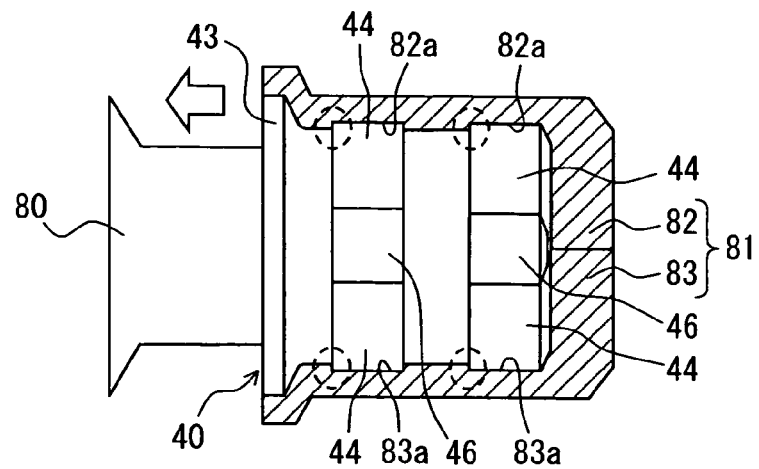
FIG. 4A is a drawing showing a process of removing an inner die from the cap member after a molding process is completed.

Now, referring to FIGS. 4A and 4B, a process of separating a molding die from the molded cap member 40 will be explained. As shown in FIG. 4A, the molding die is composed of an inner die 80 and an outer die 81 composed of an upper die 82 and a lower die 83. Molten resin is injected into a space formed between the inner die 80 and the outer die 81. After the molded resin is cooled, the inner die 80 is separated from the outer die 81, leaving the molded cap member 40 in the outer die 81.

In this process of separating the inner die 80, the inner die 80 is pulled out in the axial direction as shown with an arrow in FIG. 4A. Since the projected portions 44 of the cap member 40 engage with grooves 82a, 83a formed in the outer die 81, the molded cap member 40 stays in the outer die 81 even if the inner die 80 adheres to an inner bore of the cap member 40 with a certain force. In other words, the molded cap member 40 is held in the outer die 81 because shoulders of the projected portions 44 engage with corners of the grooves 82a, 83a at positions shown with dotted circles. Thus, the inner die 80 can be removed from the outer die 81, leaving the molded cap member 40 in the outer die 81.

Figure 4B:
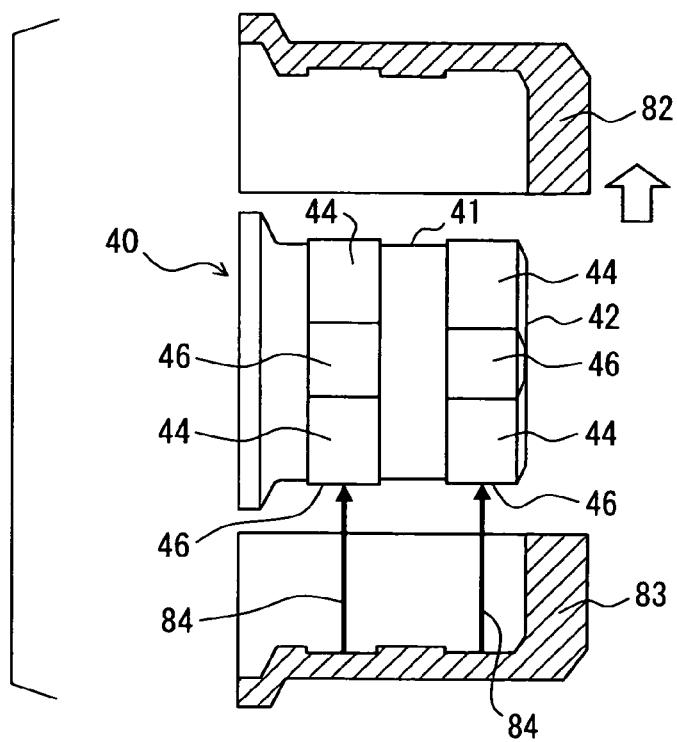
FIG. 4B is a drawing showing a process of separating upper and lower dies from the molded cap member.

As shown in FIG. 4B, the upper die 82 is separated from the cap member 40 after the inner die 80 is removed. Then, the cap member 40 is pushed up with ejector pins 84 to thereby separate the cap member 40 from the lower die 83. In this process, the ejector pins 84 push the flat portions 46 formed on a part of the projected portions 44. In a conventional process, the thin bottom wall 42 is pushed by the ejector pins for separating the molded cap member from the molding die. In the process of the present invention, the flat portions 46 having a thickness thicker than the bottom wall 42 are pushed. Therefore, deformation of the cap member 40 in the process of separating it from the molding die can be suppressed, compared with the conventional process. Thus, a cycle time of the molding process is shortened and manufacturing efficiency is improved.

In the present embodiment, the resin material containing a smaller amount of die-separating agents is used to improve the laser permeability. In this case, separation of the die from the molded cap member 40 becomes difficult. In addition, the resin having high numbers of molecules and containing a smaller amount of glass-additives is used in the present embodiment for the same purpose of improving the laser permeability. This type of the resin requires a longer time for curing. However, the molding die can be separated from the molded cap member 40 without much difficulty according to the present invention, since the projected portions 44 for anchoring the molded cap member 40 in the outer die 81 are formed, and the flat portions 46 having a sufficient thickness are formed for pushing up the molded cap member 40 with the ejector pins 84. Efficiency in the manufacturing process is improved according to the present invention.

The flat portions 46 positioned opposite (diametrically) to the flat portions for pushing with the ejector pins 84 are used as gates for injecting the molten resin. Therefore, burrs formed around the gates (i.e., around the flat portions) can be easily removed. The flat portions 46 other than those used for separating the cap member 40 from the outer die and those positioned around the injection gates serve to facilitate separation of the outer die.

The following advantages are attained in the embodiment described above in addition to the advantage (making die-separation easy) explained above. Since a tapered wall 43 is formed at the open axial end of the cap member 40, where the cap member 40 is connected to the closing member 50 by laser welding, a sufficient area for the laser welding is secured without much increasing the axial length of the cap member 40. Since a close contact between the tapered wall 43 and the closing member 50 can be established by pushing the cap member 40 from the bottom wall 42, both members can be firmly connected by the laser welding with a high reliability.

Since the projected portions 44 are not formed on the outer surface of the tapered wall 43, a thickness of the tapered wall 43 is kept thin. Therefore, the process of the laser welding is carried out with a short cycle time. Since the projected portions 44 are made in the form of the ring 45 around the center axis of the cap member 40, the anchoring force imposed on the projected portions 44 when the inner die 80 is separated is well distributed all around the ring 45. Therefore, the projecting portions 44 effectively function as the anchor.

Figure 5:
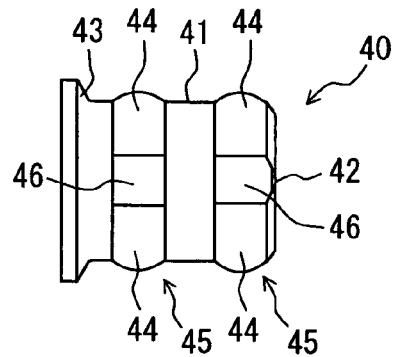
FIG. 5 is a side view showing a modified form of the cap member.
Figure 6:
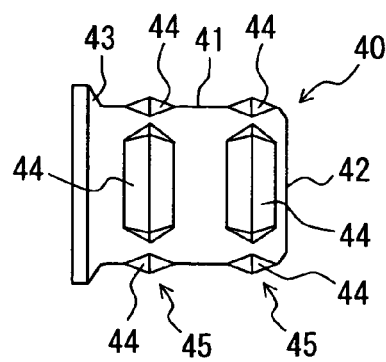
FIG. 6 is a side view showing another modified form of the cap member.
Figure 7:
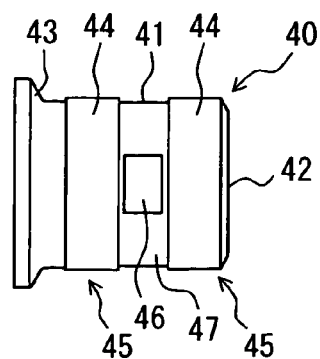
FIG. 7 is a side view showing yet another modified form of the cap member.

The shape and form of the projected portions 44 are not limited to the embodiment described above. For example, the outer surface of the projected portions 44 may be made in an arc-shape as shown in FIG. 5. Alternatively, the outer surface may be made in a form of a polygonal shape (not shown). As shown in FIG. 6, several projected portions 44 maybe formed discretely in the circumferential direction, without forming a continuous ring. As shown in FIG. 7, the flat portions 46 may be formed on the portion 47 neighboring the projected portions 44, not on the projected portions 44. Though two rings are formed by the projected portions 44 in the embodiment shown in FIGS. 4A and 4B, more than three rings may be formed.

Figure 8:
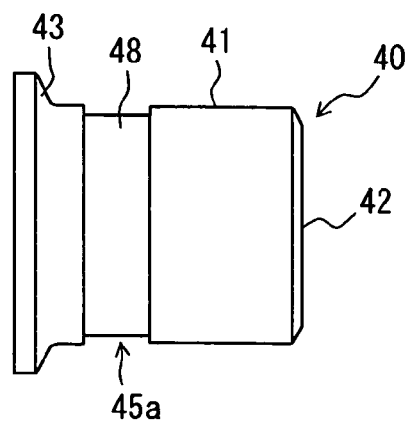
FIG. 8 is a side view showing a cap member as a second embodiment of the present invention.

A second embodiment of the present invention will be described with reference to FIGS. 8 and 9. In this embodiment, a depressed portion 48 is formed on the cylindrical wall 41 instead of the depressed portion 44 that is formed in the first embodiment. The depressed portion 48 forms a depressed ring 45a in the circumferential direction. Other structures and functions of the cap member 40 are the same as those in the first embodiment.

Figure 9:
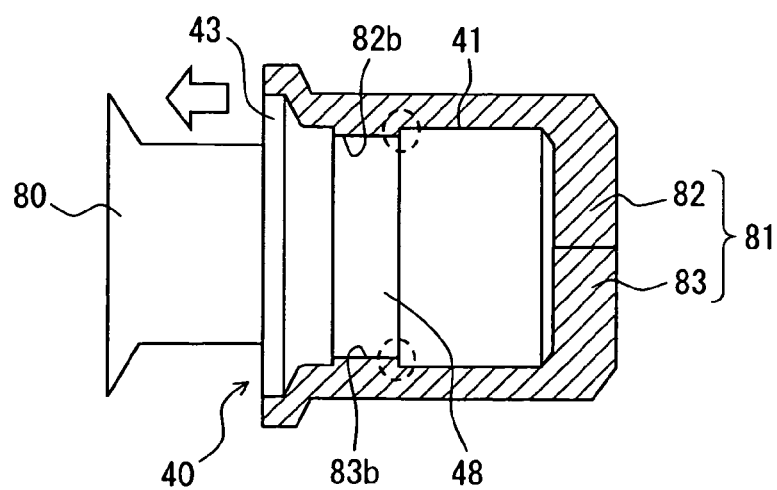
FIG. 9 is a drawing showing a process of removing an inner die from a molded cap member (the second embodiment).

The process of separating the inner die 80 from the molded cap member 40 is shown in FIG. 9. Small-bore portions 82b, 83b corresponding to the depressed portion 48 are formed in the upper die 82 and the lower die 83, respectively. Shoulders of the small-bore portions (encircled by a dotted line) serve as the anchor for preventing movement of the molded cap member 40 in the axial direction when the inner die 80 is separated from the cap member 40. After the inner die 80 is removed, the upper die 82 is lifted up, and then the molded cap member 40 is separated from the lower die 83 by pushing it with the ejector pins 84, in the same manner as shown in FIG. 4B.

The depressed portion 48 is formed on the cylindrical wall 41, not on the tapered wall 43 in this embodiment, too. Therefore, the tapered wall 43 can be firmly connected to the closing member 50 by the laser welding. Since the depressed portion 48 is made in a form of continuously depressed ring 45a, the anchoring force is well distributed all around the depressed portion 48. The form and shape of the depressed portion 48 are not limited to the embodiment shown in FIG. 8. For example, a flat portion or flat portions may be formed on the depressed portion 48 as in the first embodiment. Several depressed portions discrete along the circumferential direction may be formed. More than two depressed rings 45a may be formed.

The present invention is not limited to the embodiments described above, but it may be variously modified. For example, though either the projected portion 44 or the depressed portion 48 is formed on the outer surface of the cylindrical wall 41 in the foregoing embodiments, it is possible to form both of the projected portion 44 and the depressed portion 48. The tapered wall 43 may be eliminated, and the cylindrical wall 41 may be directly connected to the closing member 50 by the laser welding. In this case, however, a connecting strength may be somewhat sacrificed. The cap member 40 may be connected to the closing member 50 by adhesive or press-fitting or the like.

The present invention may be applied to sensors other than the rotational speed sensor. The round cylindrical wall 41 may be modified to a polygonal cylinder wall. In this case, the cap member 40 is easily removed from the outer die without forming the flat portion 46. Burrs formed around injection gates can be easily removed. The magnet 30 for providing the biasing magnetic field is not limited to a cylindrical magnet having an inner space. It may be replaced with a magnet in other shapes, an electromagnetic coil, or a combination of a magnet and an electromagnetic coil. The molding die is not limited to the die composed of the inner die 80, the upper die 82 and the lower die 83. The molding die may be composed of four or more parts.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A cap member for covering a sensor unit, the cap member comprising:
   a cylindrical wall;
   a bottom end wall closing one axial end of the cylindrical wall, a thickness of the bottom end wall being thinner than that of the cylindrical wall; and
   an open end positioned opposite to the bottom end wall, the open end to be closed with a closing member after the sensor unit is disposed in the cap member, wherein:
   the cap member is formed by molding a resin material, using a molding die having an outer die and an inner die;
   either a projected portion or a depressed portion is formed on an outer surface of the cylindrical wall, the projected portion or the depressed portion prevents the cap member from being moved in the axial direction together with the inner die when the inner die is separated from the cap member after the molding is completed; and
   the projected portion or the depressed portion is formed in a form of a belt around a center axis of the cylindrical wall.

2. The cap member as in claim 1, wherein: the sensor unit includes a sensor chip contained in the cap member in a form of a bare chip; and the open end of the cap member is closed with the closing member by connecting both by laser welding.

3. The cap member as in claim 2, wherein the cylindrical wall includes a tapered wall gradually widened toward the open end of the cap member.

4. The cap member as in claim 3, wherein either the projected portion or the depressed portion is formed on the outer surface of the cylindrical wall except the tapered wall.

5. The cap member as in claim 1, wherein a plurality of the belts are formed separately from one another in the axial direction of the cap member.

6. The cap member as in claim 1, wherein the belt is formed in a form of a continuous circular ring.

7. The cap member as in claim 1, wherein a flat portion is formed on the outer surface of the cylindrical wall.

8. The cap member as in claim 1, wherein the sensor unit includes a sensor chip having a magnetoresistive element (MRE) and means for giving a magnetic biasing field to the sensor chip.

9. A sensor device comprising the cap member defined in claim 1, a closing member for closing the open end of the cap member, the closing member having a plate extending into an inner space of the cap member, and a sensor chip mounted on the extending plate.

10. The cap member as in claim 1, wherein one or more flat portions are formed on the projected portion.

\* \* \* \* \*